(12) United States Patent
Dobler et al.

(10) Patent No.: US 8,469,157 B2
(45) Date of Patent: Jun. 25, 2013

(54) BRAKE ASSEMBLY FOR A UTILITY VEHICLE

(75) Inventors: Johann Dobler, Legau (DE); Sven Krieger, Marktoberdorf (DE); Hajo Pargmann, Unterthingau (DE); Hans-Peter Zeiler, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 195 days.

(21) Appl. No.: 13/003,504

(22) PCT Filed: Jul. 13, 2009

(86) PCT No.: PCT/EP2009/058904
§ 371 (c)(1),
(2), (4) Date: Feb. 9, 2011

(87) PCT Pub. No.: WO2010/004053
PCT Pub. Date: Jan. 14, 2010

(65) Prior Publication Data
US 2011/0120817 A1    May 26, 2011

(51) Int. Cl.
*F16D 55/02* (2006.01)
(52) U.S. Cl.
USPC ..... 188/71.8; 188/71.7; 188/72.1; 188/196 P; 188/71.5
(58) Field of Classification Search
USPC ............... 188/71.8, 71.7, 72.1, 196 R, 196 P; 192/111.1, 111.12
See application file for complete search history.

(56) References Cited

U.S. PATENT DOCUMENTS

| 2,551,252 | A | * | 5/1951 | Du Bois | 188/71.8 |
|---|---|---|---|---|---|
| 2,948,356 | A | * | 8/1960 | Butler | 188/72.3 |
| 3,338,353 | A | * | 8/1967 | Lucien | 188/196 P |
| 3,403,754 | A | * | 10/1968 | Barrett et al. | 188/71.5 |
| 3,403,755 | A | * | 10/1968 | Barrett et al. | 188/71.5 |
| 3,532,190 | A | * | 10/1970 | Palmer | 188/71.8 |
| 3,580,365 | A | * | 5/1971 | Bialkowski | 188/196 P |
| 3,729,072 | A | * | 4/1973 | Borkowski | 188/196 P |
| 3,957,146 | A | * | 5/1976 | Le Blanc | 192/70.252 |
| 4,180,147 | A | * | 12/1979 | Tjarksen et al. | 188/71.8 |
| 4,529,068 | A | * | 7/1985 | Gallo | 188/71.8 |
| 6,131,705 | A | | 10/2000 | Dahlen | |
| 6,766,886 | B2 | * | 7/2004 | Bendtsen et al. | 188/196 P |
| 7,448,477 | B2 | * | 11/2008 | Kingston et al. | 188/71.8 |
| 2007/0095621 | A1 | | 5/2007 | McConkie | |
| 2008/0116019 | A1 | | 5/2008 | Vu | |

FOREIGN PATENT DOCUMENTS
EP    0431407 A1    6/1991

OTHER PUBLICATIONS

International Search Report for PCT Application No. PCT/EP2009/058904 filed Jul. 13, 2009.

* cited by examiner

*Primary Examiner* — Robert A Siconolfi
*Assistant Examiner* — Mariano Sy

(57) ABSTRACT

A brake assembly is provided for a utility vehicle. After a brake operation, a clearance between a control member and an intermediate part and/or between a brake element and an intermediate part is adjusted by means of a displacement or restoring unit arranged in an intermediate part. Wear, and the associated change of clearance, can be compensated for by means of friction gripping devices, located respectively in the control member and in the brake element.

5 Claims, 1 Drawing Sheet

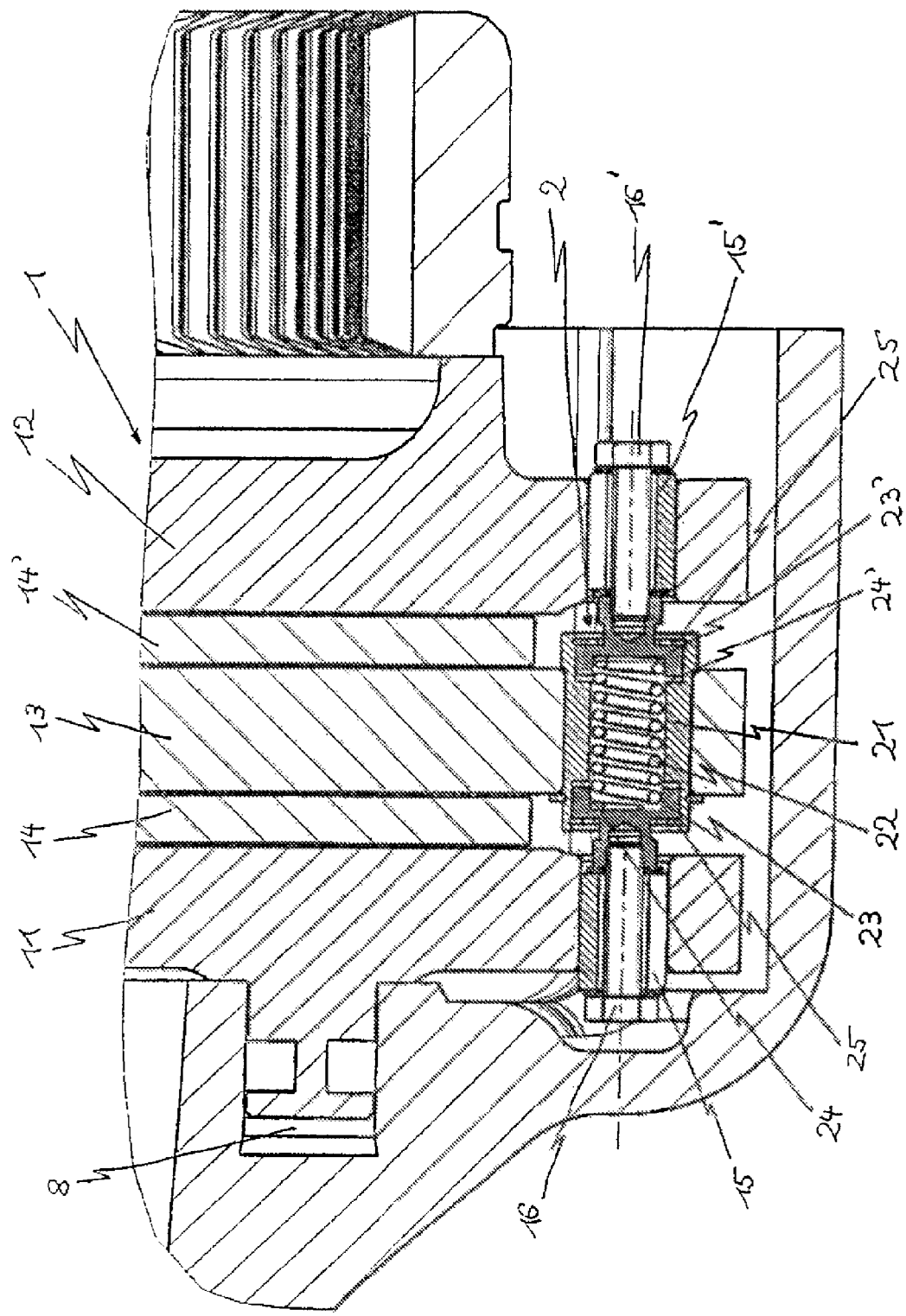

BRAKE ASSEMBLY FOR A UTILITY VEHICLE

BACKGROUND

The invention relates to a brake assembly for a utility vehicle.

The brake assemblies in the case of utility vehicles, such as for example with agricultural machines, are preferably designed as ring or annular piston brakes. In the case of ring piston brakes a fluid contained in an actuator chamber is or pressurized by a piston for example when a brake pedal is operated. Due to the pressurization the actuator fluid, a force is exerted on a control member, such as for example a ring piston. In this case the fluid can be a liquid or gaseous medium. Due to the axial movement of the control member, caused by the pressurised fluid, the utility vehicle is braked by means of a brake element, such as a brake back plate for example, coupled with the control member. The control member is coupled with the brake element by means of an intermediate part and by first and second rotatable coupling discs, which are located between the control member and the intermediate part and between the intermediate part and the brake element.

During operation of a utility vehicle, wear of the respective brake discs occurs over the course of time. Due to the wear of the respective brake discs the originally pre-set clearances in the brake increase. By clearance, it is meant the distance, which must be overcome during an axial movement between the control member and the intermediate part and/or between the brake element and the intermediate part, so that the utility vehicle can be braked. In order to prevent the clearance from increasing, exact re-setting is necessary, since otherwise the axial distance between the control member and the intermediate part and/or the brake element and the intermediate part becomes larger and larger in each case. This can lead, in the case of identical brake operations, to less or no braking action on the utility vehicle being obtained. Additionally it must be guaranteed that after a brake operation the control member, the brake element and the intermediate part again separate from the respective coupling and return to their respective initial positions.

The object of the present invention is to provide a brake assembly, which allows the separation of a coupling from the control member, the brake element and the intermediate part whilst re-setting the clearance.

This object is achieved according to the invention by the features of Claim 1. Advantageous embodiments of the invention are indicated in the sub-claims.

The advantages of the invention is that separation of a respective rotatable brake disc from control member, brake element and intermediate part, slow-running two-disc ring piston brake, is possible by means of a displacement or restoring unit arranged on the intermediate part. Furthermore re-setting of the clearance of the ring piston brake is rendered possible by means of a friction griping device. Therefore identical brake operation can be guaranteed irrespective of wear. Also the intermediate part is centred between the control member and the brake element by means of the displacement or restoring unit.

BRIEF DESCRIPTION OF THE DRAWINGS

FIG. 1 shows a section of a cutaway view of a brake assembly with re-setting of the clearance, in which the brake is in a released condition.

DETAILED DESCRIPTION OF EXAMPLE EMBODIMENTS

The brake assembly illustrated in FIG. 1 is a ring piston brake 1 for example. The ring piston brake 1 has an intermediate part 13 arranged between a control member 11 in the form of an annular piston and a brake element 12. Furthermore a first coupling 14 in the form of a rotatable brake disc is provided between the control member 11 and the intermediate part 13. Moreover a second coupling in the form of a second brake disc 14' is provided between the control member 11 and the brake element 12.

In this case the control member 11, the intermediate part 13 and the brake element 12 are non-rotatably arranged in the brake assembly. The first and second coupling 14, 14' are rotatably arranged on a drive shaft not illustrated in FIG. 1. Moreover the control member 11, the intermediate part 13 and the first and second coupling 14, 14' are axially moveable.

A fluid held in a chamber 8, which is upstream of the control member 11, is compressed therein. By means of the compressed fluid an axial force is exerted on the control member 11, which is directed towards the brake element 12. The fluid can be a liquid or gaseous medium. Due to the force exerted by the fluid, the control member 11 is axially moved towards the brake element 12. The control member 11, via the first coupling 14, will come into contact with the intermediate part 13 if the first clearance, between the control member 11 and the intermediate part 13, is exceeded.

After the first clearance has been exceeded, and with an undiminished force of the fluid exerted on the control member 11, said control member 11 and the intermediate part 13 are also moved towards the brake element 12 until a second clearance, formed between the brake element 12 and the intermediate part 13, is exceeded. Thus a braking action is exerted on the utility vehicle.

Furthermore, the intermediate part 13 has at least one recess, inside which a displacement unit in the form of a brake clearance restoring unit 2 is arranged. Here the intermediate part 13 can have three recesses for example, the central axes of which are positioned offset to one another by 120° in each case. The displacement unit 2 in each case has a sleeve 21, the outer diameter of which is in contact with the inner diameter of the recess of the intermediate part 13. The sleeve 21 possesses a through-hole and at both ends a section with an inner diameter, which is larger than the diameter of the through-hole. Thus a step is formed at both ends of the sleeve. In each case a first or second sliding element 23, 23' extends into the two opposite ends of the sleeve 21. In this case the part of the sliding element 23, 23' extending into the sleeve 21 is cup-shaped, wherein the cup walls fit into the region with the larger diameter. A spring 22 is arranged in the through-hole inside the sleeve 21, having one end in contact with the first sliding element 23 turned towards the control member 11, and the other end being in contact with the second sliding element 23' and turned towards the brake element 12. The sleeve 21 is thereby firmly located in the intermediate part 13. This axial immobilization of the sleeve 21 on the side turned towards the brake element 12 is effected by means of a step for example and on the side turned towards the control member by means of a circlip for example.

With a ring piston brake illustrated in FIG. 1 in each case a first and second cavity 24, 24' is formed between the front face, turned towards the step of the sleeve 21, of the respective sliding element 23, 23' and the face, turned towards the respective sliding element 23, 23', of the step of the sleeve 21. These cavities 24 and 24' define first and second brake clearances respectively.

Furthermore the control member 11 has at least one recess, inside which a first tensioning device 15 is arranged, wherein the outer diameter of the first tensioning or friction device 15 is in contact with the inner diameter of the recess of the control member 11. The outer diameter of the first tensioning device 15, in comparison to the inner diameter of the recess with a small over-measure, is selected in such a manner that the tensioning device must be pressed in and axial immobilization of the first tensioning device 15 inside the recess is ensured by friction up to a desired extent. However, during a brake operation a relative movement of the tensioning device 15 towards the control member 11 is effected in the event that a fluid force exerted on the control member 11 is greater than the frictional force arising between the tensioning device 15 and the control member 11. The first tensioning device 15 is thereby coupled with a first joining element 16, as a result of which the first joining element 16 is in contact with the first sliding element 23.

The brake element 12 likewise has at least one recess, inside which a second tensioning or friction device 15' is arranged. In this case the outer diameter of the second tensioning device 15' is in contact with the inner diameter of the recess of the brake element 12. Also the second tensioning device 15' is coupled with a second joining element 16', as a result of which the second joining element 16' is in contact with the second sliding element 23'. The outer diameter of the second tensioning device 15', in comparison to the inner diameter of the recess, is selected with a small over-measure, so that axial immobilization of the second tensioning device 15' inside the recess corresponding to the first tensioning device 15 is substantially ensured.

Both tensioning or friction devices 15, 15' in the present exemplary embodiment are designed as spring-type slotted pins.

The first and second joining elements 16, 16' in the present exemplary embodiment are screws. Preferably the recesses located on the control member 11 and the brake element 12 are arranged in such a manner that they lie opposite the respective recesses, located on the intermediate part 13. Also for example the central axes of the respective recesses, arranged on the control member 11 and the brake element 12, can be positioned offset to one another by 120° in each case.

During a brake operation and an axial movement, associated therewith, of the control member 11 towards the brake element 12, and thus the movement of the first joining element 16 coupled with the control member 11, the spring 22 located in the sleeve 21 is compressed by means of the first sliding element 23. In this case during a brake operation the front face, turned towards the sleeve 21, of the sliding element 23, 23' is in contact with the face turned towards the sliding element 23, 23', of the step of the sleeve 21 so that the cavities 24 and 24' are closed. In this state also the spring 22 is compressed to its maximum.

After the brake operation the control member 11 and the brake element 12 are separated from the respective coupling 14, 14' by the compressed spring 22, via the first sliding element 23, exerting a force on the control member 11 in the opposite direction to the brake element 12. Due to the axial movement of the control member 11 the sleeve 21 and thereby the intermediate part 13 also move in the same direction. This axial movement of the sleeve 21 is guaranteed by a coupling between the sleeve 21 and the respective control member 23, 23'. The coupling in this case is effected by means of circlips 25 arranged at the two ends of the sleeve 21. Moreover the coupling of the sleeve 21 with the sliding element 23, 23' can also be effected by means of other coupling elements.

As a result of the force applied by the spring 22, the control member 11 and the intermediate part 13 are pushed back in a direction turned away from the brake element 12. In this case it is ensured that the clearance set in the initial state, that is to say, before a brake operation, between the intermediate part 13 and the brake element 12 and/or between the control member 11 and the intermediate part 13, is re-set by means of the spring 22 so that cavities 24 and 24' are re-established.

In the case of heavy wear of the respective coupling device 14, 14' it may happen that during a brake operation the control member 11 is not in contact with the first coupling 14 and/or the brake element 12 is not in contact with the second coupling 14', while however the front faces, in each case turned towards the sleeve 21, of the sliding element 23, 23 and the faces, turned towards the sliding element 23, 23', of the step of the sleeve 21 are already in contact with one another. Due to the respective sliding element 23, 23' contacting the step of the sleeve 21, further axial movement of the sliding element 23, 23' is no longer possible without the slipping of friction gripping devices 15 and 15' relative to the respective control member (11) and brake element (12) respectively.

If now during the further movement of the control member 11 the force exerted by the fluid pressure on the control member 11 is greater than the frictional force between the first tensioning or friction device 15 and the control member 11 and/or between the second tensioning or friction device 15' and the brake element 12, the control member 11 can move, relative to the first tensioning device 15, in the axial direction and/or the second tensioning device 15' can move relative to the brake element 12.

After a brake operation the force exerted by the spring 22 is greater than the force exerted by the fluid pressure on the control member 11, which leads to a movement of the control member 11 and the intermediate part 13 in the direction turned away from the brake element 12. In this case the force exerted by the spring 22 is less than the frictional force between the first tensioning device 15 and the ring piston 11 and/or between the second tensioning device 15' and the brake element 12, so that a renewed relative movement of the control member 11 towards the first tensioning device 15 and/or a relative movement of the second tensioning device 15' towards the brake element 12 can no longer take place. In this case it is also ensured by the spring force that the control member 11 separates from the first coupling 14 and that the intermediate part 13 is centred with respect to the control member 11 and the brake element 12 and clearances defined by cavities 24 and 24' are again re-established.

Due to the relative movement of the first tensioning device 15 with respect to the control member 11 and/or due to the relative movement of the second tensioning device 15' with respect to the brake element 12, the control member 11 and/or the intermediate part 13, after the clearance has been re-set, can no longer return to the respective initial position, so that the control member 11 and/or the intermediate part 13 in each case moves into an axial position, which lies between the initial position and the position during the brake operation, and wherein the respective clearance corresponds to the clearance originally pre-set in each case as defined by cavities 24 and 24'.

The invention relates to a brake assembly for a utility vehicle. After a brake operation, a clearance between a control member and the intermediate part and/or between a brake element and the intermediate part is adjusted by means of a displacement or restoring unit arranged in an intermediate part. Wear and the associated change of clearance can be compensated for by means of friction gripping devices, located respectively in the control member and in the brake element.

The invention claimed is:

1. A brake assembly, comprising an intermediate part (13), arranged between a control member (11) and a brake element (12) and wherein a first coupling (14) is arranged between the control member (11) and the intermediate part (13) and a second coupling is arranged between the intermediate part (13) and the brake element (12), said brake assembly being applied by movement of the control member (11) towards the brake element (12) wherein a brake clearance restoring unit (2) is arranged inside a recess in the intermediate part (13), the restoring unit being connected with the control member (11) and brake element (12) by friction gripping devices (15,15') housed in a recess in the control member (11) and brake element (12) respectively, the connections between the restoring unit and the control member (11) and brake element (12) respectively allowing the control member (11) to move towards the intermediate part (13) during application of the brake by a first predetermined brake clearance (24) to compress the restoring unit (2) and the intermediate part (13) to move towards the brake element (12) by a second predetermined brake clearance(24') to compress the restoring unit (2) without the friction gripping devices (15,15') slipping relative to the control member (11) and brake element (12) respectively, the restoring unit moving the control member (11) and brake element (12) away from the intermediate part (13) to re-establish the brake clearances (24,24') when the brake is released.

2. A brake assembly according to claim 1, wherein the restoring unit (2) has a sleeve (21), arranged inside the recess of the intermediate part (13), with a spring element (22) arranged inside the sleeve (21), one end of the spring element (22) being in contact with a first sliding element (23) connected with the control member (11) and the opposite end of the spring element (22) being in contact with a second sliding element (23') connected with the brake element (12), and wherein the respective sliding element (23, 23') can move relative to the sleeve (21) by the first and second predetermined clearances (24,24') respectively.

3. A brake assembly according to claim 1, wherein the friction gripping devices (15, 15') are designed as sprung slotted pins.

4. A brake assembly according to claim 1, wherein central axes of the recesses of the brake element (12), the control member (11) and the intermediate part (13) are arranged coaxially to one another and a number of restoring units (2) are arranged at angularly spaces distances relative to the brake element (12), the control member (11) and the intermediate part (13).

5. A brake assembly according to claim 1 wherein, if the movement of the control member (11) relative to the intermediate part (13) or the movement of the intermediate part (13) relative to the brake element (12) during application of the brake exceeds the first and second brake clearances (24, 24') respectively, the respective friction gripping devices (15, 15') slip to allow application of the brake and on release of the brake the first and second brake clearances (24,24') are re-established by the restoring unit (2).

* * * * *